US009062886B2

(12) United States Patent
De La Cruz Garcia et al.

(10) Patent No.: US 9,062,886 B2
(45) Date of Patent: Jun. 23, 2015

(54) SEQUENTIAL COMBUSTOR GAS TURBINE INCLUDING A PLURALITY OF GASEOUS FUEL INJECTION NOZZLES AND METHOD FOR OPERATING THE SAME

(75) Inventors: Marta De La Cruz Garcia, Zürich (CH); Andre Burdet, Fribourg (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 1145 days.

(21) Appl. No.: 12/985,512

(22) Filed: Jan. 6, 2011

(65) Prior Publication Data

US 2011/0179800 A1 Jul. 28, 2011

(30) Foreign Application Priority Data

Jan. 26, 2010 (EP) .................................. 10151622

(51) Int. Cl.
*F23R 3/34* (2006.01)
*F02C 3/34* (2006.01)
*F01K 23/10* (2006.01)
*F02C 9/34* (2006.01)
(Continued)

(52) U.S. Cl.
CPC .................. *F23R 3/343* (2013.01); *F01K 23/10* (2013.01); *F02C 3/34* (2013.01); *F02C 9/34* (2013.01); *F22B 1/1815* (2013.01); *F23C 9/00* (2013.10); *F23C 2900/07002* (2013.01); *F23D 2900/00015* (2013.01); *F23R 3/286* (2013.01); *F23R 2900/03341* (2013.01)

(58) Field of Classification Search
CPC ........... F23R 2900/03341; F23R 3/286; F23R 3/346; F01K 23/10; F02C 6/18; F02C 3/34; F22B 1/1815; F23C 9/00; F23C 2900/07002

USPC ................ 60/39.17, 39.52, 39.182, 733, 746, 60/39.5, 776, 752–760
See application file for complete search history.

(56) References Cited

U.S. PATENT DOCUMENTS 5,689,948 A * 11/1997 Frutschi ......................... 60/774
5,906,095 A * 5/1999 Frutschi et al. ................ 60/775
(Continued)

FOREIGN PATENT DOCUMENTS

DE       10334228         3/2004
DE       10360951         7/2005
(Continued)

OTHER PUBLICATIONS

Search Report for German Patent App. No. 10 2011 008 009.0 (Sep. 7, 2011).
(Continued)

*Primary Examiner* — William H Rodriguez
(74) *Attorney, Agent, or Firm* — Buchanan Ingersoll & Rooney PC

(57) ABSTRACT

A gas turbine (1) includes a compressor (2) that feeds an oxidizer to one or more combustion devices (3, 5) in which fuel is injected and is combusted to generate hot gases that are expanded in a turbine (4, 6). The flue gases discharged from the turbine (4, 6) are partially recirculated into the compressor (2). The fuel is a gaseous fuel that is injected into the combustion devices (3, 5) via two or more stages (20, 22, 23). One of the stages is a pilot stage (20) in which the fuel is injected along a longitudinal axis (21) of the combustion device (3, 5) or an axis parallel thereto.

14 Claims, 2 Drawing Sheets

(51) Int. Cl.
*F22B 1/18* (2006.01)
*F23C 9/00* (2006.01)
*F23R 3/28* (2006.01)

(56) References Cited

U.S. PATENT DOCUMENTS

| | | | |
|---|---|---|---|
| 6,161,385 A * | 12/2000 | Rebhan et al. | 60/646 |
| 6,199,363 B1 * | 3/2001 | Frutschi | 60/775 |
| 6,202,399 B1 * | 3/2001 | Frutschi | 60/773 |
| 6,250,065 B1 * | 6/2001 | Mandai et al. | 60/776 |
| 6,256,976 B1 | 7/2001 | Kataoka et al. | |
| 6,957,539 B2 * | 10/2005 | Lebas et al. | 60/772 |
| 7,003,939 B1 | 2/2006 | Rackwitz et al. | |
| 7,726,019 B2 * | 6/2010 | Eroglu et al. | 29/888.011 |
| 7,780,437 B2 * | 8/2010 | Bernero et al. | 431/75 |
| 7,908,842 B2 * | 3/2011 | Eroglu et al. | 60/39.17 |
| 8,033,821 B2 * | 10/2011 | Eroglu | 431/9 |
| 8,220,271 B2 * | 7/2012 | Poyyapakkam et al. | 60/740 |
| 8,511,059 B2 * | 8/2013 | Poyyapakkam et al. | 60/39.17 |
| 8,621,870 B2 * | 1/2014 | Carroni et al. | 60/776 |
| 2004/0029058 A1 | 2/2004 | Eroglu | |
| 2006/0183069 A1 * | 8/2006 | Bernero et al. | 431/354 |
| 2006/0272331 A1 | 12/2006 | Bucker et al. | |
| 2006/0277918 A1 | 12/2006 | Eroglu et al. | |
| 2007/0034171 A1 | 2/2007 | Griffin et al. | |
| 2009/0068609 A1 * | 3/2009 | Eroglu et al. | 431/354 |
| 2009/0277182 A1 | 11/2009 | Engelbrecht et al. | |
| 2009/0282831 A1 * | 11/2009 | Eroglu et al. | 60/737 |
| 2010/0175382 A1 * | 7/2010 | Eroglu | 60/748 |
| 2012/0247116 A1 * | 10/2012 | Meeuwissen et al. | 60/772 |

FOREIGN PATENT DOCUMENTS

| | | |
|---|---|---|
| DE | 102004027702 | 1/2006 |
| EP | 1328760 | 7/2003 |
| EP | 1734306 | 12/2006 |
| JP | 07504265 A | 5/1995 |
| JP | 20022130676 A | 5/2002 |
| WO | 93/17279 A1 | 9/1993 |
| WO | WO01/96785 | 12/2001 |
| WO | WO2004/109075 | 12/2004 |
| WO | WO2007/082608 | 7/2007 |
| WO | WO2007/110298 | 10/2007 |
| WO | WO2009/068425 | 6/2009 |

OTHER PUBLICATIONS

Search Report for EP Patent App. No. 10151622.7 (Sep. 10, 2010).
Office Action issued on Sep. 22, 2014, by the Japanese Patent Office in corresponding Japanese Patent Application No. 2011-12453, and an English Translation of the Office Action. (11 pages).

* cited by examiner

SEQUENTIAL COMBUSTOR GAS TURBINE INCLUDING A PLURALITY OF GASEOUS FUEL INJECTION NOZZLES AND METHOD FOR OPERATING THE SAME

This application claimed priority under 35 U.S.C. §119 to European App. No. 10151622.7, filed 26 Jan. 2010, the entirety of which is incorporated by reference herein.

BACKGROUND

1. Field of Endeavor

The present invention relates to a method for operating a gas turbine, and to a gas turbine. In particular, the invention relates to a gas turbine whose flue gases are partly recirculated and partly fed to a $CO_2$ capture plant.

2. Brief Description of the Related Art

FIG. 1 shows an example of a power plant having a sequential combustion gas turbine 1 including a compressor 2 that feeds a combustion device 3, in which a fuel 13 is injected and combusted forming hot gases that are expanded in a high pressure turbine 4; the flue gases from the high pressure turbine 4 are fed into a second combustion device 5 in which further fuel 15 is injected and combusted, forming hot gases that are further expanded in a low pressure turbine 6.

The flue gases from the low pressure turbine 6 are supplied into a heat exchanger 7 to supply energy to a steam turbine plant 8.

After having passed through the heat exchanger 7, the flue gases pass through a cooler where they are cooled to be then introduced into a diverter 9, where a first flue gas flow is diverted into a mixer 10 to be mixed with fresh air to form a mixture that is fed to the compressor 2.

From the diverter 9 a second flue gas flow is diverted into a $CO_2$ capture plant 11.

This power plant lets the $CO_2$ emissions be controlled and reduced, but in some cases, it may cause different drawbacks.

In fact, since the combustion devices operate with an oxidizer (being the mixture of recirculated flue gases and fresh air) having a lower oxygen concentration than fresh air, during operation the flame stability is reduced when compared to the flame stability of combustion devices operated with fresh air.

This may cause pulsations and increase the blow out temperature, so reducing the operational flexibility; in addition, the unburned hydrocarbon and CO emissions may also increase, in particular at part load operation.

SUMMARY

One of numerous aspects of the present invention includes a method and a gas turbine by which the aforementioned problems of the known art are addressed.

Another aspect of the invention includes a method and a gas turbine that allow stable operation even when the gas turbine is fed with a mixture of fresh air and recirculated flue gases. In particular during operation the flame stability is increased with respect to traditional gas turbines.

Another aspect of the invention includes a method and a gas turbine that, during operation, generate reduced pulsations and have an increased operational flexibility when compared to traditional gas turbines.

In addition, unburned hydrocarbon and CO emissions can be lower than in traditional gas turbines.

BRIEF DESCRIPTION OF THE DRAWINGS

Further characteristics and advantages of the invention will be more apparent from the description of a preferred but non-exclusive embodiment of the method and gas turbine according to the invention, illustrated by way of non-limiting example in the accompanying drawings, in which.

DETAILED DESCRIPTION OF EXEMPLARY EMBODIMENTS

Figure 1:
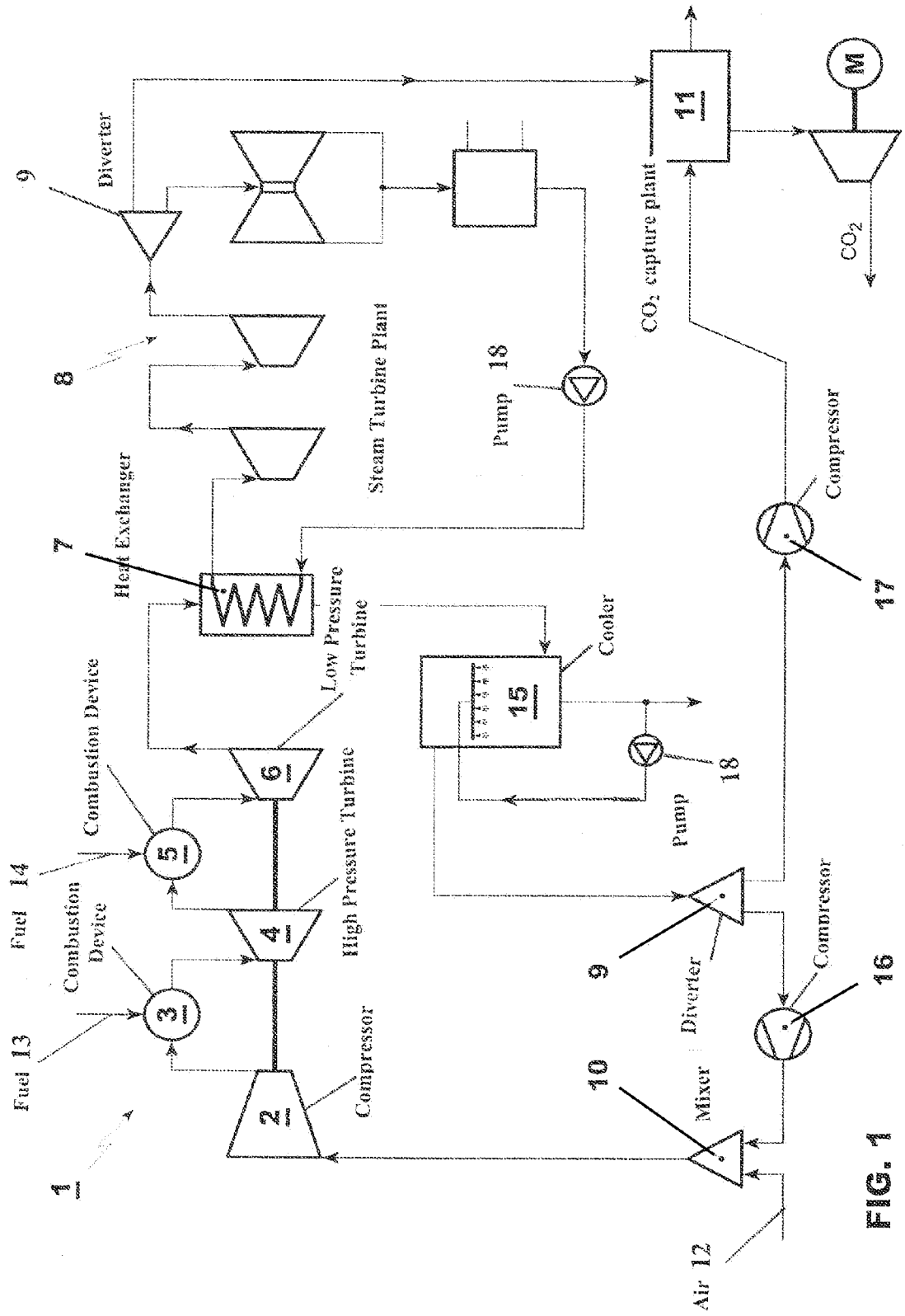
FIG. 1 is a schematic view of a power plant.

With reference to the figures and using like references for like or similar elements to those already described, a gas turbine 1 including a compressor 2 that feeds a compressed oxidizer to at least a combustion device 3 is shown; in the combustion device 3, fuel is injected and is combusted to generate hot gases that are expanded in a high pressure turbine 4.

In addition, the gas turbine 1 also has a second combustion device 5 into which the combusted gases coming from the high pressure turbine 4, that are still partially composed of oxygen, are introduced together with further fuel. This further fuel is thus combusted, generating hot gases that are expanded in a low pressure turbine 6 (sequential combustion gas turbine).

Even if a sequential combustion gas turbine has in particular been described, in different embodiments of the invention the gas turbine may also be a traditional gas turbine having a compressor, a combustion device, and a turbine, without a second combustion device and low pressure turbine.

In the following, reference to the sequential combustion gas turbine is made, modification of the method and gas turbine to adapt them to a traditional gas turbine not being a sequential combustion gas turbine are self evident and thus not described in detail.

The flue gases discharged from the low pressure turbine 6 are partially recirculated into the compressor 2.

In this respect, these flue gases pass through the heat exchanger 7, where they are cooled to heat the thermodynamic fluid circulating in a steam turbine plant 8, and then they pass through a further cooler 15 where they are further cooled.

Afterwards the flue gases enter into the diverter 9 such that a first portion thereof is diverted (via a compressor 16) into a mixer 10 where they are mixed with fresh air 12 to form a mixture, being the oxidizer that is fed into the compressor 2.

A second portion of the flue gases is diverted into a $CO_2$ capture plant 11 (via a compressor 17), where $CO_2$ is separated and stored, for example in liquid form.

In the combustion device 3 and/or combustion device 5, gaseous fuel is injected via at least two stages, one of the stages being a pilot stage 20 in which fuel is injected along a longitudinal axis 21 of the combustion device or an axis parallel thereto.

Thus preferably, according to methods embodying principles of the present invention, only gaseous fuel is injected into the combustion chamber 3 and/or 5, but no liquid fuel.

Figure 2:
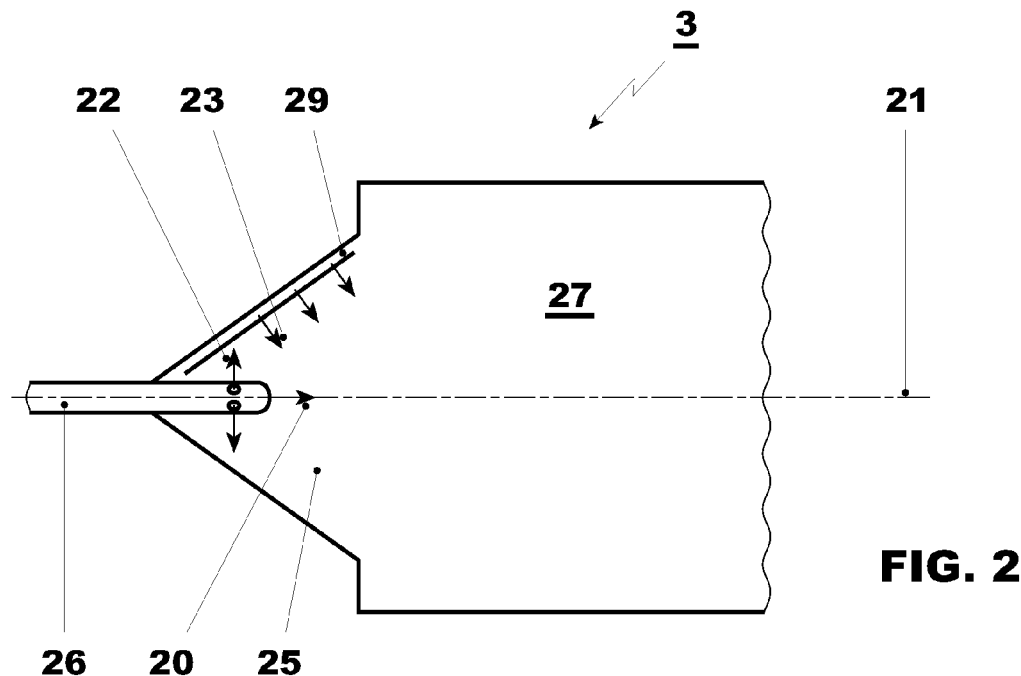
FIG. 2 is a schematic view of a combustion device in an embodiment of the invention.

In particular, FIG. 2 shows a combustion device 3 being the first combustion device of a sequential combustion gas turbine.

Figure 3:
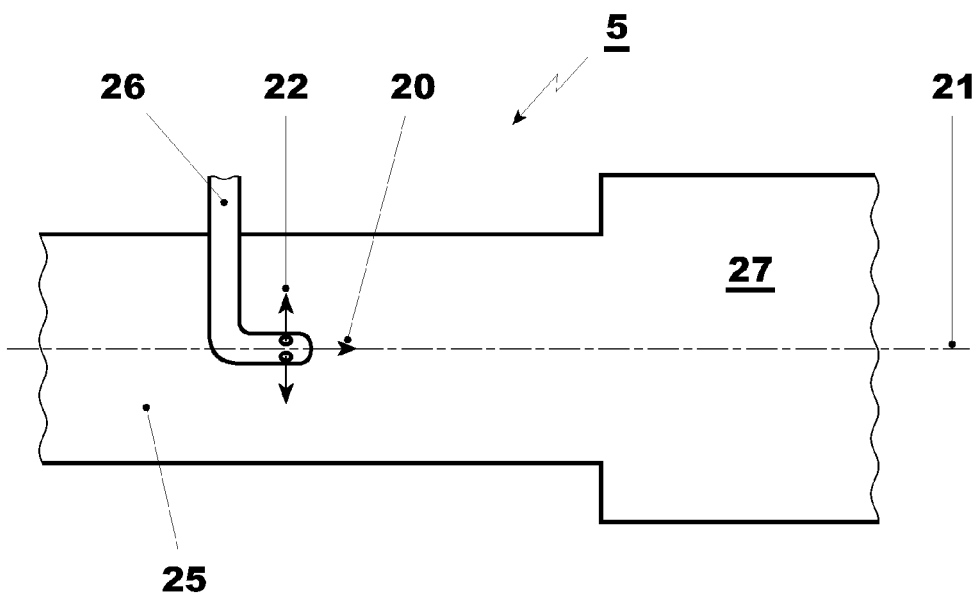
FIG. 3 is a schematic view of a different combustion device in a further embodiment of the invention.

In FIG. 3 reference 20 indicates the pilot stage, reference 22 indicates the first stage and reference 23 indicates a second stage.

The combustion device 3 includes a substantially conical mixing chamber 25 with a lance 26 extending along its longitudinal axis 21 and a combustion chamber 27 downstream of the mixing chamber 25.

The mixing chamber wall has tangential slots 29 for oxidizer entrance and nozzles for fuel entrance of the second stage 23; likewise the lance 26 has side nozzles for fuel entrance of the first stage 22.

In addition, the lance 26 has at least a nozzle at its tip arranged to inject fuel of the pilot stage 20.

FIG. 3 shows a combustion device 5 being the second combustion device of a sequential combustion gas turbine.

In this figure reference 20 indicates the pilot stage and reference 22 indicates the first stage; no second stage is provided in this embodiment.

The combustion device 5 has a tubular mixing chamber 25 with a lance 26 transversally extending therein and a combustion chamber 27 downstream of it.

The lance 26 has side nozzles for fuel entrance of the first stage 22 and, in addition, at least a further nozzle at its tip for fuel entrance of the pilot stage 20.

The method for operating the gas turbine includes injecting the fuel via at least two stages, one of the stages being the pilot stage 20 in which fuel is injected along a longitudinal axis 21 of the combustion device 3 or 5 or an axis parallel thereto.

In particular, the method includes determining the amount of fuel to be injected in the combustion device 3 and/or 5 and divide this amount among the stages.

Gas fuel is advantageously injected into the combustion device 3 and/or 5 via the pilot stage 20; in addition, gas fuel is injected via the first stage and, when provided, also via the second stage.

In an embodiment of the method implemented in the combustion device 3, wherein the combustion device has three stages 20, 22, 23, the amount of fuel is divided among these three stages.

Advantageously, during operation the portions of fuel injected via the first stage, the second stage, and the pilot stage can be adjusted for a better control of the engine operation.

In particular, during operation between 50-70% of the fuel mass flow rate is injected via the first stage, between 20-30% of the fuel mass flow rate the fuel is injected via the second stage and between 5-25% of the fuel mass flow rate is injected via the pilot stage.

In the embodiment of the method implemented in the combustion device 5, wherein the combustion device has two stages 20, 22, the amount of fuel is divided between these two stages.

Advantageously, during operation the portions of fuel injected via the first stage and the pilot stage can be adjusted for a better control of the engine operation.

In particular, during operation between 75-85% of the fuel mass flow rate is injected via the first stage and between 15-25% of the fuel mass flow rate the fuel is injected via the pilot stage.

During operation the gas pilot fuel generates a fuel rich zone immediately downstream of the lance 26, in a portion of the combustion device astride its longitudinal axis.

This zone generates a flame having a high temperature (diffusion combustion) that allows operation of the gas turbine both at full load and also at part load to be improved.

In fact, surprisingly and notwithstanding the shortage of oxygen, a better combustion and more stable flame was observed and the flame was anchored immediately downstream of the mixing chamber 25 thus avoiding its downstream shift.

This allowed the pulsations to be sensibly reduced.

In addition, since the flame is anchored at the entrance of the combustion chamber 27, the fuel has more time to completely burn, such that a reduction of unburned hydrocarbon and CO emissions was ascertained.

Moreover, even if the flame temperature is higher (the higher the combustion temperature, the higher the $NO_x$ production), an increase of the $NO_x$ emissions was not observed.

In fact, due to the higher temperatures, the $NO_x$ concentration in the flue gases upstream of the flame front is higher than in traditional combustion devices.

Moreover, since the front flame is thicker than in traditional combustion devices, the $NO_x$ concentration further increases during combustion.

Nevertheless, the $NO_x$ production downstream of the flame front (i.e., while the flue gases pass through the combustion chamber and reach the turbine 4 or 6) proved to be much lower than in traditional gas turbines.

Globally these effects proved to balance each other, such that the $NO_x$ concentration in the flue gas generated with the method and the gas turbine in the embodiments of the invention is substantially the same with the traditional method and gas turbines.

Naturally the features described may be independently provided from one another.

In practice the materials used and the dimensions can be chosen at will according to requirements and to the state of the art.

REFERENCE NUMBERS 1 gas turbine
2 compressor
3 combustion device
4 high pressure turbine
5 combustion device
6 low pressure turbine
7 heat exchanger
8 steam turbine plant
9 diverter
10 mixer
11 $CO_2$ capture plant
12 fresh air
13 fuel
14 fuel
15 cooler
16 compressor
17 compressor
18 pump
20 pilot stage
21 longitudinal axis
22 first stage
23 second stage
25 mixing chamber
26 lance
27 combustion chamber
29 slot While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a gas turbine having at least one compressor that feeds an oxidizer to at least one combustion device, the method comprising:
   injecting and combusting fuel to generate hot gases;
   expanding the hot gases in a turbine;
   discharging the flue gases from the turbine;
   at least partially recirculating the discharged flue gases into the at least one compressor;
   wherein injecting comprises injecting in said at least one combustion device a gaseous fuel via three stages, one of the three stages being a pilot stage in which fuel is injected along or parallel to a longitudinal axis of the at least one combustion device;
   compressing a first flue gas flow which is diverted from the flue gases of the gas turbine with fresh air in the at least one compressor;
   determining the amount of fuel to be injected in the at least one combustion device; and
   dividing said amount among the three stages, wherein the at least one combustion device comprises a substantially conical mixing chamber with a lance extending along a longitudinal axis and a combustion chamber downstream of the mixing chamber, a mixing chamber wall with tangential slots for oxidizer entrance and nozzles for fuel entrance, wherein the lance has side nozzles, and wherein the first stage is defined by the nozzles at the mixing chamber wall and the second stage is defined by the side nozzles of the lance, and wherein the lance ends in the mixing chamber.

2. A method according to claim 1, wherein the lance comprises a nozzle at its tip arranged to inject fuel, and the pilot stage is defined by the nozzle at the tip of the lance.

3. A method according to claim 2, wherein, during operation, injecting comprises injecting between 50-70% of the fuel mass flow rate via the first stage, between 20-30% of the fuel mass flow rate the fuel via the second stage, and between 5-25% of the fuel mass flow rate via the pilot stage.

4. A method according to claim 1, wherein said lance comprises a tip nozzle defining the pilot stage.

5. A method according to claim 1, wherein, during operation, injecting comprises injecting between 75-85% of the fuel mass flow rate via the first stage and between 15-25% of the fuel mass flow rate via the pilot stage.

6. A method according to claim 1, wherein discharging comprises diverting a portion of the flue gases discharged from the turbine into a $CO_2$ capture plant.

7. A method according to claim 1, comprising:
   feeding oxidizer to the at least one combustion device, and wherein the oxidizer has a lower oxygen concentration than fresh air.

8. A method according to claim 1, comprising:
   operating the gas turbine at full load with a pilot flame.

9. A gas turbine comprising:
   a turbine;
   at least one combustion device configured and arranged to combust fuel to generate hot gases, and to deliver said hot gases to said turbine to be expanded;
   at least one compressor configured and arranged to feed an oxidizer to the at least one combustion device;
   a recirculation gas path configured and arranged to receive flue gases discharged from the turbine and to partially recirculate the flue gases into the at least one compressor;
   wherein the at least one combustion device comprises three stage gaseous fuel injection, one of the three stages being a pilot stage in which fuel is injected along or parallel to a longitudinal axis of the at least one combustion device, and wherein the at least one combustion device comprises a substantially conical mixing chamber with a lance extending along a longitudinal axis and a combustion chamber downstream of the mixing chamber, a mixing chamber wall with tangential slots for oxidizer entrance and nozzles for fuel entrance, wherein the lance has side nozzles, and wherein the first stage is defined by the nozzles at the mixing chamber wall and the second stage is defined by the side nozzles of the lance, and wherein the lance ends in the mixing chamber; and
   wherein the at least one compressor compresses a first flue gas flow which is diverted from the flue gases of the gas turbine with fresh air.

10. A gas turbine according to claim 9, further comprising:
    a $CO_2$ capture plant; and
    a diverter gas path leading to the $CO_2$ capture plant, wherein flue gases discharged from the turbine are partially diverted into the $CO_2$ capture plant.

11. A gas turbine according to claim 9, wherein the oxidizer, which is fed to the at least one combustion device, has a lower oxygen concentration than fresh air.

12. A gas turbine according to claim 9, wherein the gas turbine is operated at full load with a pilot flame.

13. A gas turbine according to claim 9, wherein the lance comprises a nozzle at its tip to inject fuel, and the pilot stage is defined by the nozzle at the tip of the lance.

14. A method for operating a gas turbine having at least one compressor that feeds an oxidizer to at least one combustion device, the method comprising:
    injecting and combusting fuel to generate hot gases;
    expanding the hot gases in a turbine;
    discharging the flue gases from the turbine;
    at least partially recirculating the discharged flue gases into the at least one compressor;
    wherein injecting comprises injecting in said at least one combustion device a gaseous fuel via at least two stages, one of the at least two stages being a pilot stage in which fuel is injected along or parallel to a longitudinal axis of the at least one combustion device;
    compressing a first flue gas flow which is diverted from the flue gases of the gas turbine with fresh air in the at least one compressor;
    determining the amount of fuel to be injected in the at least one combustion device; and
    dividing said amount among the at least two stages, wherein said at least one combustion device has only two stages, and dividing comprises dividing the amount of fuel between the two stages, and the at least one combustion device has a tubular mixing chamber with a lance transversally extending therein and a combustion chamber downstream of the lance, and the lance comprises side nozzles defining the first stage, and wherein said nozzles are on a side wall of an axially extending section of the lance.

* * * * *